United States Patent [19]

Harman

[11] 4,098,634

[45] Jul. 4, 1978

[54] REPRINT FILM CARRIER

[75] Inventor: John N. Harman, Glendale, Calif.

[73] Assignee: Drewry Photocolor Corporation, Burbank, Calif.

[21] Appl. No.: 780,609

[22] Filed: Mar. 24, 1977

[51] Int. Cl.[2] .......................... B32B 31/00; B31F 5/00

[52] U.S. Cl. ..................................... 156/302; 156/554

[58] Field of Search ............... 156/302, 303, 554, 560, 156/552

[56] References Cited

U.S. PATENT DOCUMENTS

| | | | |
|---|---|---|---|
| 3,727,815 | 4/1973 | Schwartz | 156/554 |
| 3,767,513 | 10/1973 | Gnage et al. | 156/554 |
| 3,941,646 | 3/1976 | Petry et al. | 156/554 |

*Primary Examiner*—Douglas J. Drummond

*Attorney, Agent, or Firm*—Fulwider, Patton, Rieber, Lee & Utecht

[57] ABSTRACT

Method and apparatus for assembling for reprinting a plurality of film strip portions into a continuous film strip by adhesively affixing the film strip portions to a film carrier comprising a paper tape to which has been joined an adhesive tape along one edge to form an adhesive stripe along that edge. The carrier cooperates with a film gate including an indexing edge for aligning the film strip portions for subsequent adhesive fixing to the edge of the carrier. Alternate embodiments for the film gate indexing structure for different size film are disclosed. The film carrier is marked with printing instructions for some or all of the individual negatives affixed thereto.

4 Claims, 4 Drawing Figures

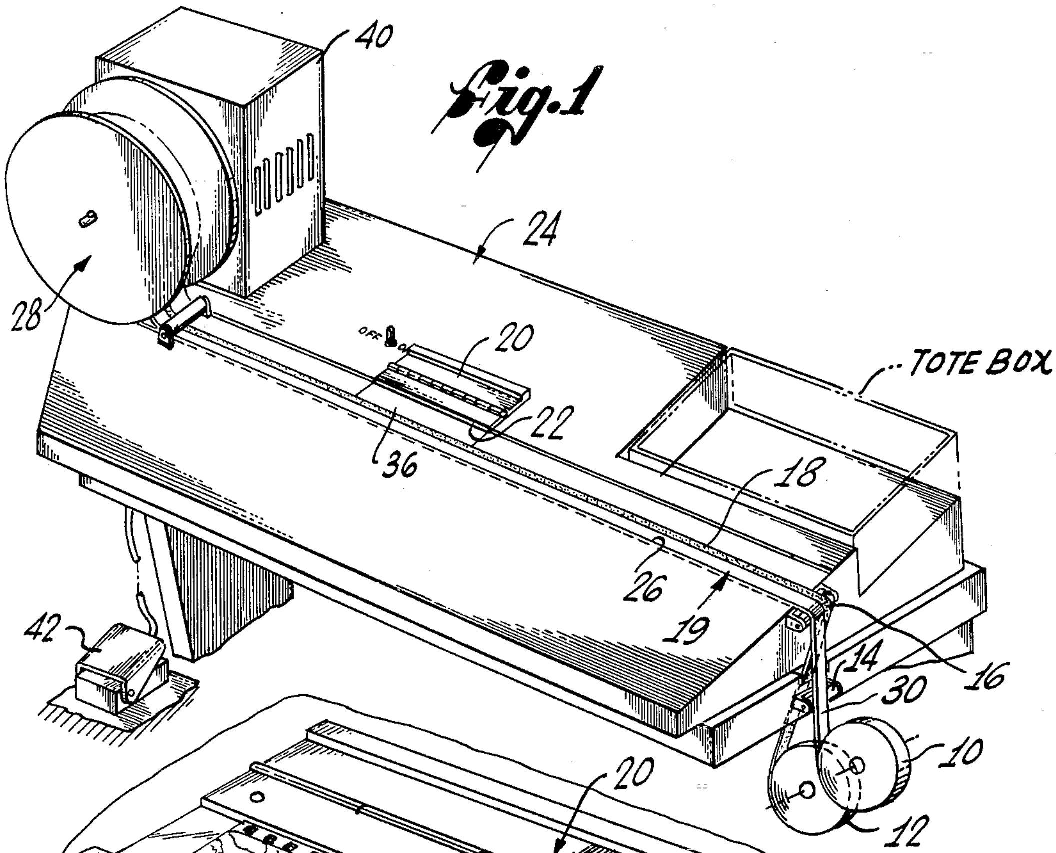
Fig.1
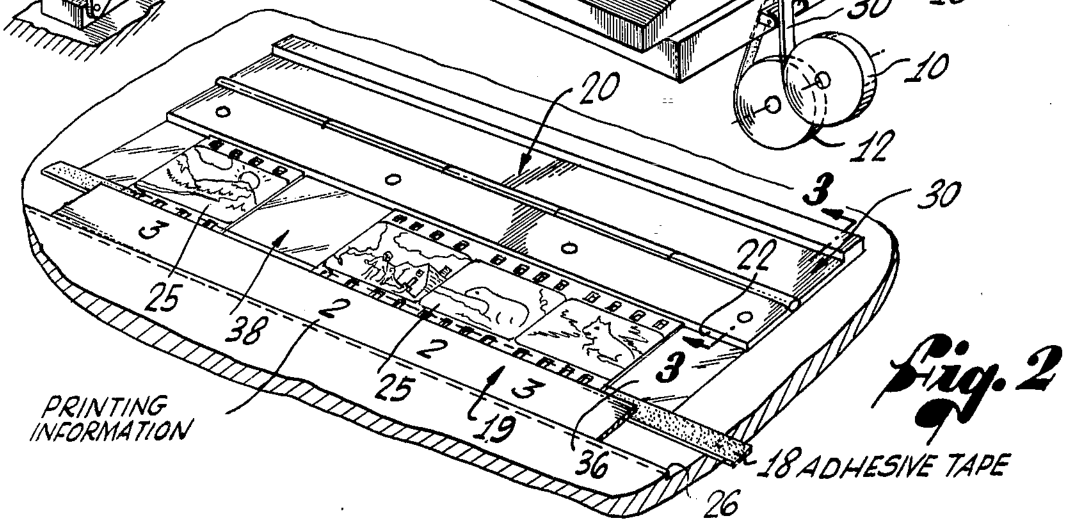
Fig.2
Fig.3
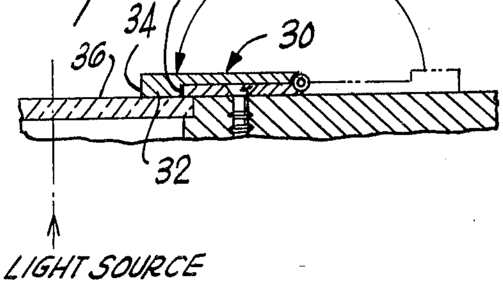
Fig.4
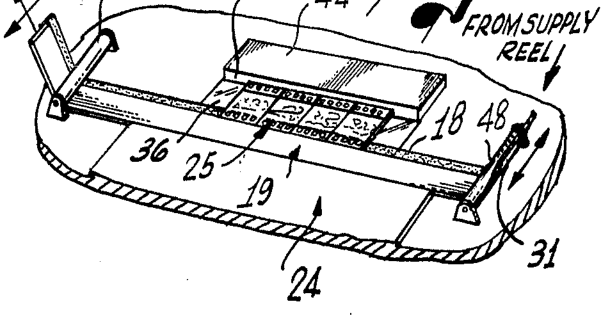

REPRINT FILM CARRIER

BACKGROUND OF THE INVENTION

1. Field of the Invention

The present invention relates generally to the making of prints from negatives and, more particularly, to the reprinting of particular negatives from a plurality of film strip portions.

2. Description of the Prior Art

When prints are first made from developed rolls of film, they are most easily handled as a long continuous film strip. After printing, the long film strips are typically cut into film strip portions of two to three negatives each for ease of handling.

When a customer desires a number of additional prints from that roll of film, it becomes a laborious task to handle a number of relatively small film strip portions and to determine the correct negative number and the number and size of prints desired for that customer. To alleviate this problem, a number of techniques have been proposed including splicing a plurality of the film strip portions together to form a continuous film strip. But this technique presents the additional problem of separating individual customer negatives and there is still the problem of identifying the correct negatives for reprinting. Another proposed technique is to affix film strip portions for a single customer to a transparent acetate strip with separations between customers' negatives and including on the acetate strip printing information identifying negatives and the number and size of prints desired. This technique, however, has the disadvantage of perhaps introducing dirt and other foreign particles between the negative and the acetate which are difficult to remove.

Examples of the prior art relating to splicing techniques are shown in U.S. Pat. Nos. 2,171,259; 2,940,884 and 3,959,048. There has been a need in the field of reprinting from film strip portions for a technique which would permit the use of continuous film strip and which would also provide printing information for the negatives to be reprinted. The present invention satisfies that need.

SUMMARY OF THE INVENTION

The present invention provides reprinting film carrier technique in which a plurality of film strip portions may be affixed to a film carrier along an edge of the film portions to affect the negatives in a minimal manner. The assembled film strip portions function as a continuous film strip but which provides a separation for the negatives of a particular customer and which also provides a film carrier upon which printing information may be placed to increase speed and accuracy in reprinting of the desired negatives. This technique also permits a much improved speed in the final checking of the negatives and the produced prints.

The film carrier cooperates with a film gate which includes an indexing edge to properly orient the film strip portions before adhesively affixing them to a web on which has been joined an adhesive tape along an edge to form an adhesive stripe along that edge. The edges of the film strip portions are then affixed to the web by means of the adhesive stripe. The invention includes alternate means for properly indexing and affixing films of varying size. In one embodiment, the film carrier remains fixed in position and the indexing edge is varied in position. In a second embodiment, the indexing edge remains stationary and the film carrier and its associated guide rollers are varied in position.

These and other features of the invention will become apparent from a consideration of the following detailed description.

BRIEF SUMMARY OF THE DRAWINGS

FIG. 1 is a perspective view of a reprint film processor including the features of the present invention;

FIG. 2 is a fragmentary perspective view of one embodiment of film gate;

FIG. 3 is a fragmentary sectional view taken in the direction of lines 3—3 of FIG. 2; and FIG. 4 is a fragmentary perspective view of a second embodiment of film gate which may be utilized with the present invention.

DESCRIPTION OF THE PREFERRED EMBODIMENT

Turning now to the drawings, the reprint film carrier system of the present invention includes a source of a continuous web of flexible material such as the reel of paper tape 10 and a source of adhesive tape such as may be supplied on a reel 12. A means for joining the web and adhesive tape such as guide rollers 14 and 16 form a film carrier 19 which includes an adhesive stripe 18 along an edge of the web. The film carrier is transported across a film gate 20 including an indexing edge means such as edge 22 of a plate upstanding from the operator's console 24 with the film carrier maintained in position with respect to the indexing edge by means of a positioning means such as the groove 26. Following indexing of film strip portions 25 and affixing them to the edge of the carrier by the adhesive stripe 18, the film carrier 19 and affixed film strip portions 25 are led to a take up means such as the take up reel 28 where the continuous generated negative film strip is wound for further processing.

More particularly, adhesive tape from reel 12 is led to one position on guide roller 16 and a web of paper tape 30 is led to a position on guide roller 16 which is above a portion of the adhesive tape and affixed thereto leaving an exposed adhesive stripe 18 to form the film carrier 19 which is led to an operative position with respect to film gate 20. With the film carrier 19 fixed in the positioning groove 26, the film strip portions 25 are urged against the indexing edge 22 and their free ends pushed into contact with the adhesive stripe 18 to fix the portions in place on the film carrier.

A first embodiment of an adjustable film gate 20 which may be utilized in the present invention is illustrated in FIG. 2. A first indexing edge 22 is formed by a free edge of an elongated plate with hinged adjustable indexing means to provide for a change in film size. In this respect, FIG. 2 illustrates the hinged indexing means in a first position for use with a larger film size. If a smaller film size is desired, a hinged spacer 30 is moved into position over the indexing edge 22, as shown in FIG. 3, which illustrates the hinged spacer as having a lip 32 which overhangs the indexing edge 22 to form a second indexing edge 34 to accommodate a smaller film size. In both cases, the film strip portions 25 are illuminated from below by means of a light source (FIG. 3) which illuminates a translucent plate 36 below the film gate 20.

The film carrier 19 is positioned with respect to indexing edges 22 or 34 by means of the positioning groove 26 which is slightly depressed from the plane of the translucent plate 36 and hinged plate above which the indexing edges rise.

An alternate form of adjustable film gate for accommodating different film sizes is illustrated in FIG. 4 in which an indexing plate 44 containing an indexing edge 46 is fixed in position and the film carrier 19 is maintained in a parallel attitude with respect to the indexing edge and is movable toward and away from the indexing edge by means of positionally variable supply reels and take up reels together with associated guide rollers 48 and 50. The indexing of the film strip portions 25 is the same and the joining of the stripe 18 on the web of paper tape 30 to form the film carrier 19 is the same except that the joining roller (not shown) is movable.

When the film strip portions 25 are in position and affixed to the film carrier 19, printing information regarding the identity of the customer may be placed once and the number of prints desired placed beneath each negative. It should be appreciated that for a particular film strip portion, it may not be desired to reprint each negative. Thus, the information entered below each negative is of great importance to the operator of the printer in that he need only look for the information associated with negatives to be printed. In addition, after the printing is completed, it is conventional to check the customer's order against the generated prints and, again, the information on the film carrier below each negative is of great value in saving time.

After the printing information has been entered, the film carrier 19 and affixed film strip portions 25 are moved off the film gate 20 and further film strip portions 25 are affixed to the film carrier 19 to form a continuous film strip with the only gaps between negatives separating individual customer's negatives as illustrated by the gap 38 shown in FIG. 2. The generated continuous film strip is wound onto the take up reel 28 driven either manually or by motor means such as contained in the motor housing 40 which is con-rolled by means of a foot switch 42.

Thus, it can be seen that the reprint film system of the present invention provides a technique for assembling a plurality of individual film strip portions into a continuous film strip containing printing information for each negative to be reprinted. The continuous film strip is assembled utilizing a film gate having a relatively simple indexing edge for the film strip portions to be assembled and the portions are affixed to a film carrier by means of an adhesive stripe along an edge of the portions which leaves the picture portion of the negatives unaffected for higher quality reprints.

While a particular presently preferred embodiment of the invention has been described in detail above, it should be appreciated that additional variations in the construction are possible and the invention is not to be limited except by the following claims.

I claim:

1. Apparatus for assembling a plurality of individual film strip portions into a continuous film strip, comprising:

a source of a substantially continuous web of flexible material;

a source of substantially continuous adhesive tape;

means for joining said web and said adhesive tape along their longitudinal edges to form a film carrier having an adhesive stripe along one edge of said web;

film gate means for receiving said film carrier in successive stationary sections for assembling film strip portions on each successive section in turn;

indexing edge means for indexing said film strip portions within said film gate means;

film carrier positioning means for positioning said carrier with respect to said indexing edge within said film gate means whereby said film strip portions may be affixed to said film carrier by means of said adhesive stripe, take up means for accepting said successive film carrier sections and affixed film strip portions as a continuous film strip.

2. The apparatus defined in claim 1 wherein:

indexing edge means includes an elongated plate having an indexing edge along one edge thereof and a hinged spacer along another edge thereof, said spacer having a lip defining a second indexing edge when hinged over said indexing edge defined by said first side, whereby film strip portions of different widths may be indexed; and said film carrier positioning means includes a groove in a planar coplanar with said elongated plate and parallel with said indexing edge, said groove being spaced from said indexing edge in accordance with the width of the film strip portions and said web, an edge of said film carrier opposite said adhesive stripe abutting said groove.

3. The apparatus as defined in claim 1 wherein:

said indexing edge means includes an elongated plate having said indexing edge along one side thereof; and said film carrier positioning means includes means for maintaining said film carrier in a parallel attitude with respect to said indexing edge and for moving said parallel film carrier toward or away from said indexing edge to accommodate film strip portions of varying widths.

4. A method for assembling a plurality of film strip portions into a substantially continuous film strip comprising the steps of:

joining a substantially continuous web of flexible material with a substantially continuous adhesive tape along their longitudinal edges to form a film carrier having an adhesive stripe along one edge thereof;

positioning said film carrier in a film gate means in successive stationary sections so that said adhesive stripe is a predetermined distance from and substantially parallel to an indexing edge;

indexing said film strip portions against said indexing edge and affixing said portions to said film carrier by means of said adhesive stripe, said portions being assembled on said successive stationary sections of said film carrier to form a substantially continuous film strip;

providing printing instrictions adjacent each negative to be printed on said web of said film carrier; and taking up said substantially continuous film strip onto a take up means.

* * * * *